(12) United States Patent
Fink et al.

(10) Patent No.: US 8,096,193 B2
(45) Date of Patent: Jan. 17, 2012

(54) TURBINE FLOW METER HAVING EASILY REMOVABLE METER CARTRIDGE

(75) Inventors: Daniel R. Fink, Stephenville, TX (US); James R. Soltau, Stephenville, TX (US); Donald L. Douglas, Stephenville, TX (US)

(73) Assignee: FMC Technologies, Inc., Houston, TX (US)

( * ) Notice: Subject to any disclaimer, the term of this patent is extended or adjusted under 35 U.S.C. 154(b) by 1 day.

(21) Appl. No.: 12/455,338

(22) Filed: Jun. 1, 2009

(65) Prior Publication Data
US 2010/0300213 A1    Dec. 2, 2010

(51) Int. Cl.
*G01F 1/05*  (2006.01)
(52) U.S. Cl. .................... 73/861.79; 73/861.83
(58) Field of Classification Search .................. None
See application file for complete search history.

(56) References Cited

U.S. PATENT DOCUMENTS

| | | | | |
|---|---|---|---|---|
| 3,053,087 A | * | 9/1962 | Waugh | 73/861.78 |
| 3,301,053 A | * | 1/1967 | Walch, Jr. et al. | 73/861.78 |
| 3,439,538 A | * | 4/1969 | Farrell | 73/861.83 |
| 3,534,602 A | * | 10/1970 | Boyd | 73/861.78 |
| 3,842,655 A | * | 10/1974 | Schlatter et al. | 73/32 R |
| 3,880,003 A | * | 4/1975 | Jameson | 73/861.78 |
| 3,910,115 A | * | 10/1975 | Bonner | 73/861.92 |
| 3,948,099 A | * | 4/1976 | Geisow | 73/861.92 |
| 3,952,592 A | * | 4/1976 | Schlatter et al. | 73/861.04 |
| 5,509,434 A | * | 4/1996 | Boyd et al. | 137/8 |
| 5,866,824 A | * | 2/1999 | Schieber | 73/861.79 |
| 5,876,610 A | * | 3/1999 | Clack et al. | 210/739 |
| 6,051,144 A | * | 4/2000 | Clack et al. | 210/739 |
| 6,065,352 A | * | 5/2000 | Schieber | 73/861.79 |
| 6,250,167 B1 | * | 6/2001 | Peace et al. | 73/861.77 |
| 6,898,987 B1 | | 5/2005 | Hayman | |
| 2004/0118755 A1 | * | 6/2004 | MacDonald et al. | 210/87 |

OTHER PUBLICATIONS

Hoffer Flow Controls, Inc., technical data sheet entitled, "Turbine Flowmeters by Hoffer", Product Bulletin HO-WG-104E (undated).
Cameron Measurement Systems, product brochure entitled, "1502 WECO Union Liquid Turbine Flowmeter" (undated).

* cited by examiner

*Primary Examiner* — Harshad Patel
(74) *Attorney, Agent, or Firm* — Henry C. Query, Jr.

(57) ABSTRACT

A turbine flow meter comprises a flow pipe which includes an axial through bore and a meter cartridge which is positioned in the through bore. The meter cartridge includes a tubular cartridge housing through which a fluid to be measured is directed and a rotor which is rotatably supported in the cartridge housing. The cartridge housing is slidably received in a first portion of the through bore and comprises an outer diameter which is less than the diameter of that portion of the through bore. The meter cartridge is retained in the through bore by a retainer, which in turn is retained in the through bore by a ring seal.

24 Claims, 5 Drawing Sheets

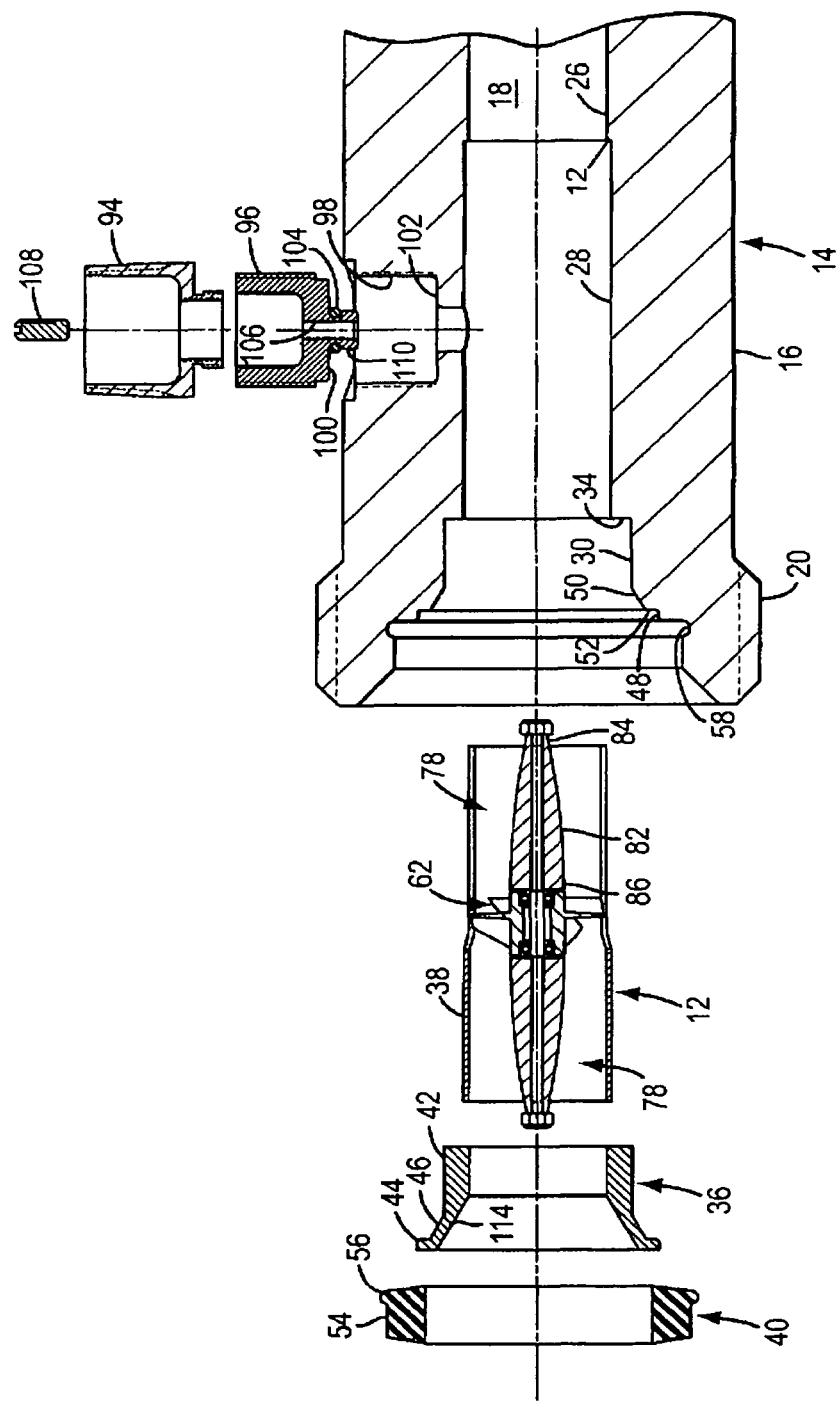

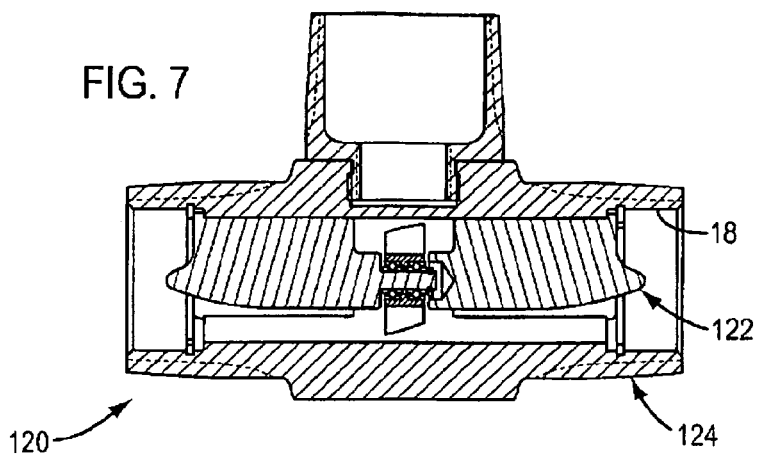
FIG. 7
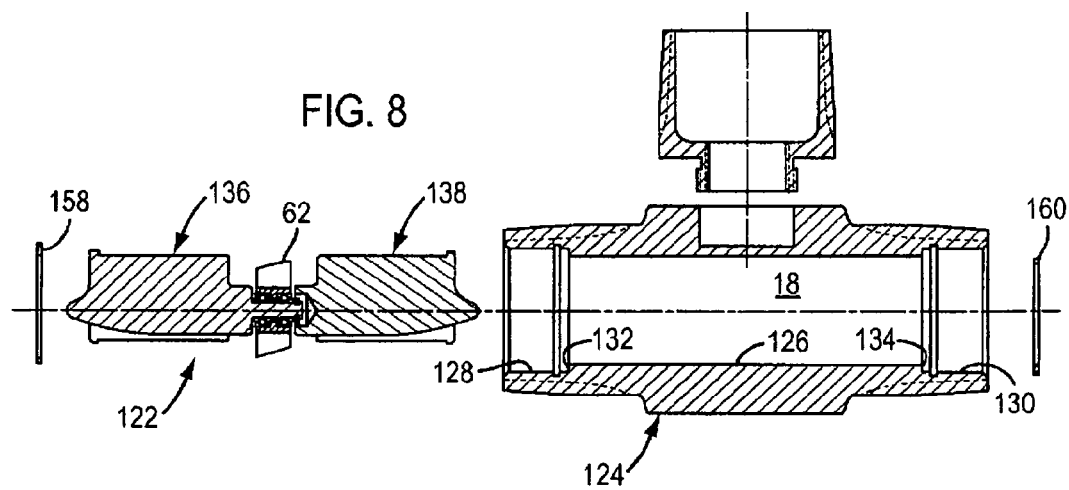
FIG. 8
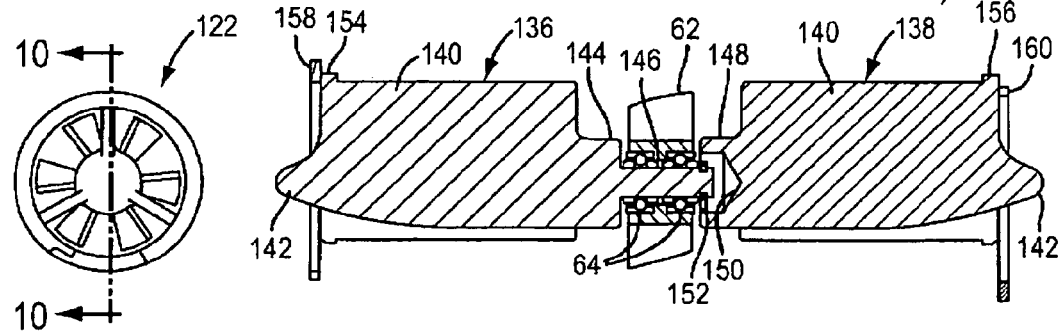
FIG. 9
FIG. 10

TURBINE FLOW METER HAVING EASILY REMOVABLE METER CARTRIDGE

BACKGROUND OF THE INVENTION

The present invention relates to turbine flow meter for measuring the flow rate of various fluids. More particularly, the invention is directed to a turbine flow meter in which the rotor is supported in a meter cartridge which may be installed and removed relatively quickly and easily.

Turbine flow meters are used to measure the flow rate of a fluid, i.e., a liquid or gas, being conveyed through a piping system. A typical prior art turbine flow meter includes a length of pipe which is connectable to the piping system, a rotor which is rotatably supported in the pipe, and a magnetic pickup which is mounted in a radial port that extends through the pipe proximate the rotor. In operation, fluid flowing through the pipe spins the rotor, and the rotation of the rotor is detected by the magnetic pickup. The signal from the pickup is transmitted to the meter electronics, which converts the signal into an indication of the rate of flow of the fluid through the pipe.

The rotor is commonly mounted on a shaft which in turn is supported in the pipe by a number of stators around which the fluid is permitted to flow. In one prior art turbine flow meter, these internal meter components are assembled together and then press fit into the pipe to retain them in place. However, this arrangement requires special tools to install and remove the internal meter components, which in turn may require that the turbine flow meter be returned to the factory for maintenance and repair. In another prior art turbine flow meter, the internal meter components are assembled within the pipe and are retained in place by a pair of retaining clips, each of which is inserted into an opposite end of the pipe. Accordingly, in order to remove the internal meter components for maintenance and repair, the retaining clips must be removed, which is a time consuming process that may require specialized tools. In addition, once removed from the pipe, the internal meter components may separate and be dropped or lost.

SUMMARY OF THE INVENTION

In accordance with the present invention, these and other limitations in the prior art are addressed by providing a turbine flow meter which comprises a flow pipe having an axial through bore through which a fluid to be measured may flow; a meter cartridge which comprises a tubular cartridge housing and a rotor which is rotatably supported in the cartridge housing; the cartridge housing being slidably received in a first portion of the through bore and comprising an outer diameter which is less than the diameter of the first portion of the through bore; and means for retaining the meter cartridge within the first portion of the through bore.

In accordance with one embodiment of the invention, the retaining means comprises a generally cylindrical retainer which engages an end of the meter cartridge.

In accordance with another embodiment of the invention, the retainer is slidably received in a second portion of the through bore and comprises an outer diameter which is less than the diameter of the second portion of the through bore.

In accordance with yet another embodiment of the invention, the retaining means may comprise means for securing the retainer within the second portion of the through bore, such as a ring seal which is secured to the flow pipe and which engages an end of the retainer opposite the meter cartridge. The ring seal may comprise an annular body and a lip which extends radially outwardly from the body and is received in a corresponding groove in the through bore.

In accordance with a further embodiment of the invention, the turbine flow meter also includes a magnetic pickup which detects rotation of the rotor, a pickup adapter within which the pickup is mounted, and an intermediate adapter within which the pickup adapter is mounted. In this embodiment, the intermediate adapter is mounted in a radial port in the flow pipe which is connected to a portion of the through bore adjacent the rotor.

In accordance with still another embodiment of the invention, the turbine flow meter comprises a focus tip which is mounted in an aperture in the intermediate adapter. In this embodiment, the intermediate adapter may be made of a material which magnetically isolates the focus tip from the flow pipe.

In accordance with yet another embodiment of the invention, the turbine flow meter may include a number of supplemental ports in the flow pipe which are connected to the through bore and within which corresponding sensors may be mounted.

Thus, the present invention provides a turbine flow meter in which the internal meter components are mounted in an integrated meter cartridge that in turn is installed in the through bore of the flow pipe. In addition, since the outer diameter of the meter cartridge is smaller than the diameter of the through bore, and since the meter cartridge is held in position by a retainer which forms a relatively loose fit with the through bore and which itself is held in position by an easy to remove ring seal, both the retainer and the meter cartridge can be quickly and easily removed for maintenance and repair without the need for special tools. In addition, the meter cartridge may be easily handled without the risk of the internal meter components being separated and consequently dropped or lost.

These and other objects and advantages of the present invention will be made apparent from the following detailed description, with reference to the accompanying drawings. In the drawings, the same reference numbers may be used to denote similar components in the various embodiments.

BRIEF DESCRIPTION OF THE DRAWINGS

FIG. 2 is an exploded cross sectional view of the left hand portion of the turbine flow meter shown in FIG. 1;

FIG. 7 is a longitudinal cross sectional view of another embodiment of the turbine flow meter of the present invention;

FIG. 8 is an exploded cross sectional view of the turbine flow meter shown in FIG. 7;

FIG. 9 is an end view of meter assembly component of the turbine flow meter shown in FIG. 7; and FIG. 10 is a cross sectional view of the meter assembly component taken along line 10-10 of FIG. 9;

DETAILED DESCRIPTION OF THE INVENTION

Figure 1:
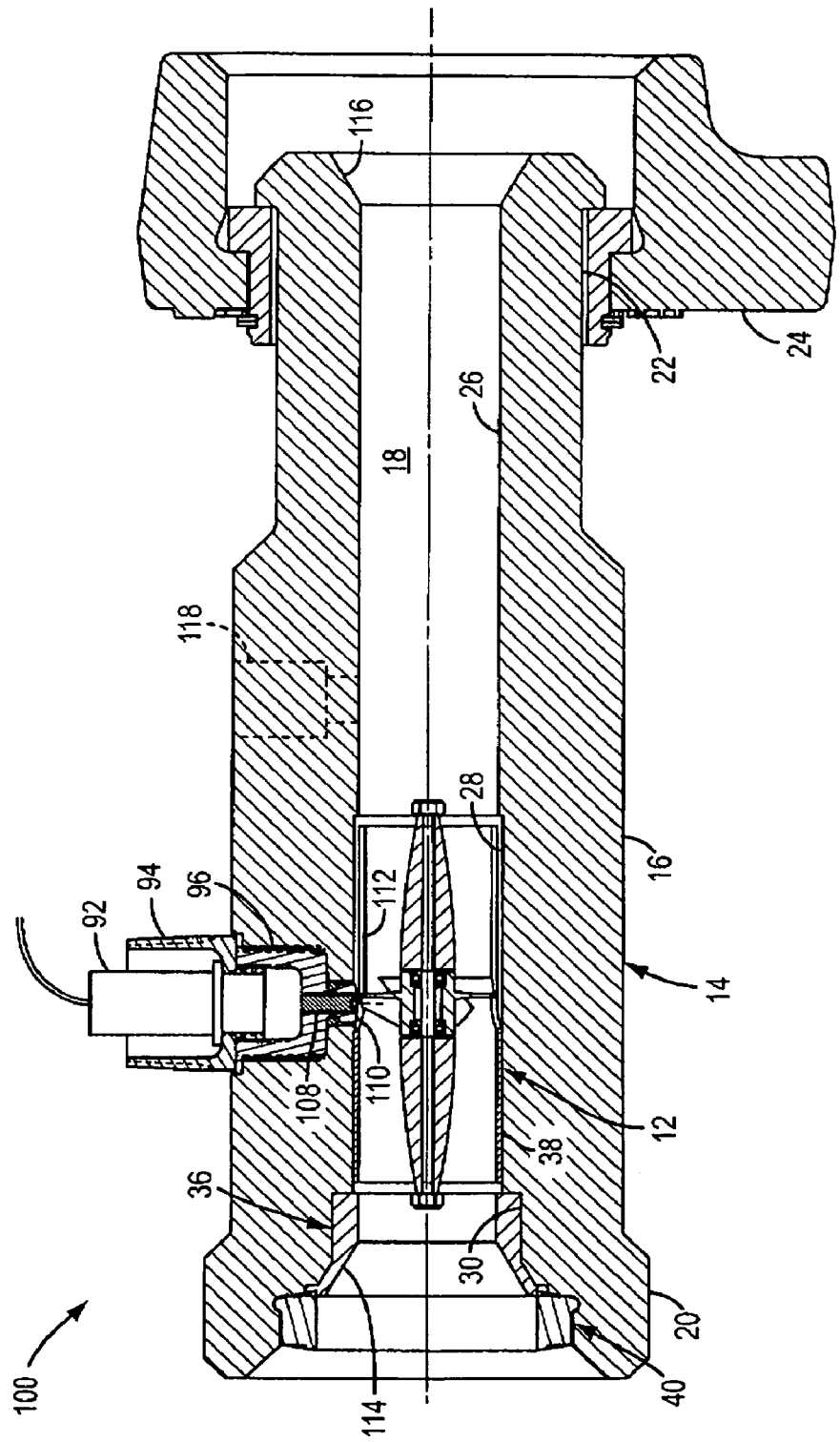
FIG. 1 is a longitudinal cross sectional view of one embodiment of the turbine flow meter of the present invention.
Figure 4:
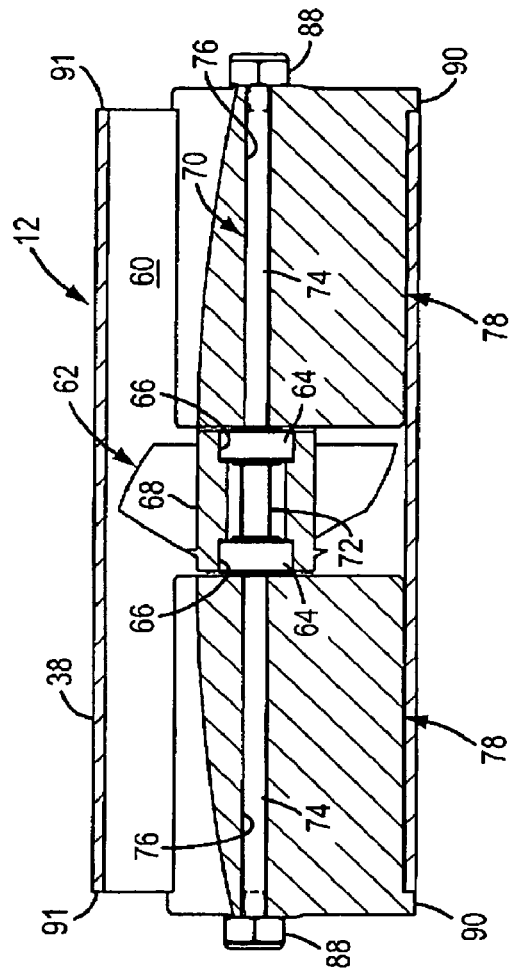
FIG. 4 is a cross sectional view of the meter cartridge taken along line 4-4 of FIG. 3.
Figure 3:
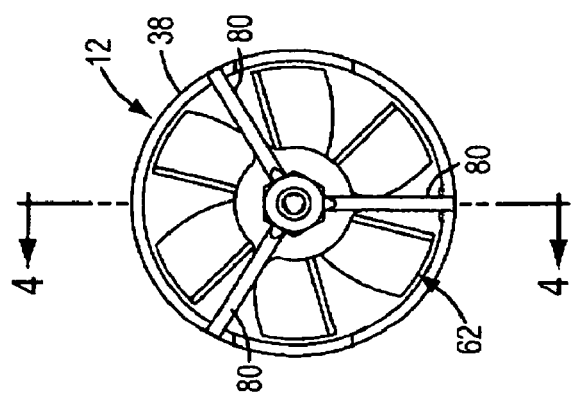
FIG. 3 is an end view of meter cartridge component of the turbine flow meter shown in FIG. 1.
Figure 5:
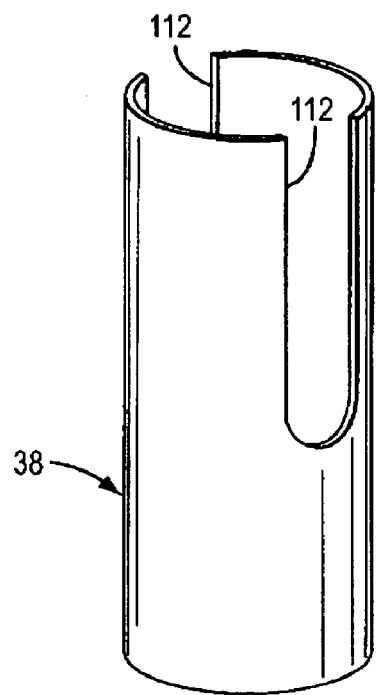
FIG. 5 is a perspective view of the cartridge housing component of the meter cartridge shown in FIG. 4.
Figure 6:
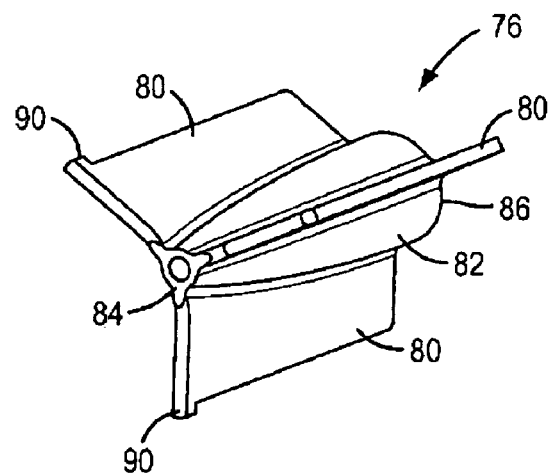
FIG. 6 is a perspective view of one of the stator components of the meter cartridge shown in FIG. 4.

Referring to FIGS. 1 and 2, a turbine flow meter in accordance with one embodiment of the present invention, generally 10, comprises a meter cartridge 12 which is removably mounted in a tubular flow pipe 14. The flow pipe 14 can be adapted from any of a number of pipes, joints or adapters which are typically used to construct a piping system through which a fluid is conveyed. In the illustrative embodiment of the invention shown in FIGS. 1 and 2, for example, the flow pipe 14 is a modified flowline adapter. Accordingly, the flow pipe 14 comprises an elongated body 16 and a through bore 18 which extends axially through the body. The body 16 includes a first end 20 and a second end 22, each of which are connectable to other components of a typical piping system by conventional means, such as a wing union 24. In addition, the body 16 is ideally made from a high strength metal, such as 4340 steel.

In accordance with the present invention, the flow pipe 14 is designed to hold the meter cartridge 12 in a relatively loose fit arrangement in the through bore 18 so that the meter cartridge may be installed and removed fairly easily using simple tools. Although the through bore 18 may be configured in a variety of ways to achieve this purpose, in the embodiment of the invention shown in the Figures the through bore includes a first bore section 26, a second bore section 28 which comprises a diameter that is larger than that of the first bore section, and a third bore section 30 which comprises a diameter that is larger than that of the second bore section. Accordingly, a first shoulder 32 is formed between the first and second bore sections 26, 28 and a second shoulder 34 is formed between the second and third bore sections 28, 30.

The meter cartridge 12 is positioned in the second bore section 28 against the first shoulder 32 and is held in place by a retainer 36. The meter cartridge 12 includes a tubular cartridge housing 38 which comprises an outer diameter that is ideally slightly smaller than the diameter of the second bore section 28. In one embodiment of the invention, for example, the cartridge housing 38 comprises an outer diameter of 1.375 inches and the second bore section 28 comprises a diameter of 1.377 inches. In this manner, the meter cartridge 12 forms a relatively loose sliding fit with the second bore section 28. Also, the length of the meter cartridge 12 may be the same as or slightly smaller than the length of the second bore section 28. In the embodiment of the invention just described, for example, the meter cartridge 12 is 3.700 inches long and the second bore section 28 is 3.708 inches long. Further details of the meter cartridge 12 will be provided below.

The retainer 36 is positioned in the third bore section 30 and serves to secure the meter cartridge 12 against the first shoulder 32 to thereby retain the meter cartridge within the through bore 18. The retainer 36 is ideally made from a high strength metal, such as 4340 stainless steel. Although the retainer 36 may be secured within the third bore section 30 by any suitable means, such as threads, it is preferably relatively loosely received within the third bore section and held therein by a ring seal 40. In the embodiment of the invention shown in the drawings, for example, the retainer 36 comprises a generally cylindrical body portion 42 which is positioned in the third bore section 30 against the second shoulder 34. Also, the outer diameter of the body portion 42 is ideally made slightly smaller than the diameter of the third bore section 30 so that the body portion will form a relatively loose sliding fit with the third bore section. Such an arrangement will simplify the installation and removal of the retainer 36. In the exemplary embodiment of the invention discussed above, for example, the outer diameter of the body portion 42 is 1.750 inches and the diameter of the third bore section is 1.755 inches.

The retainer 36 may also comprise a radially outwardly extending rim 44 which is connected to the body portion 42 by a conical surface portion 46. If so, the through bore 18 ideally includes a fourth bore section 48 which comprises a diameter that is larger than that of the third bore section 30, a conical fifth bore section 50 which diverges from the third bore section toward the fourth bore section, and a third shoulder 52 which is formed between the fourth and fifth bore sections. Thus, when the retainer 36 is installed in the flow pipe 14, the rim 44 is positioned in the fourth bore section 48 against the third shoulder 52 and the conical surface portion 46 engages the conical fifth bore section 50.

The ring seal 40 serves to hold the retainer 36 within the flow pipe 14. While the ring seal 40 may comprise a variety of configurations which will achieve this purpose, in the embodiment of the invention shown in the drawings the ring seal includes an annular body 54 and a lip 56 which extends radially outwardly from the body. In addition, the ring seal 40 is optimally made of a non-metallic material, such as nitrile, to allow the lip 56 to snap into a corresponding groove 58 in the through bore 18. When the ring seal 40 is installed, the body 54 secures the rim 44 of the retainer 36 against the third shoulder 52 to thereby secure the retainer within the flow pipe 14.

Moreover, the ring seal 40 may be easily removed with a simple tool, such as a screw driver or a pick. Accordingly, since both the meter cartridge 12 and the retainer 36 form a relatively loose sliding fit with the through bore 18, these components can be quickly and easily removed from the flow pipe 14 by simply removing the ring seal 40.

Referring now to FIGS. 3 through 6, the meter cartridge 12 comprises a number of standard flow measurement components which are mounted in the cartridge housing 38. In this manner, the flow measurement components can be installed in and removed from the flow pipe 14 as an assembled unit. Moreover, since the outer diameter of the meter cartridge 12 is slightly smaller than the diameter of the second section 28 of the through bore 18, the meter cartridge can be installed in and removed from the flow pipe 14 by simply removing the ring seal 40 and the adapter 36.

The cartridge housing 38 is a generally cylindrical member which defines a flow bore 60 through which the fluid to be measured is directed. A rotor 62 is rotatably supported in the flow bore 60. As the fluid passes through the flow bore 60, it strikes the helical surface of the rotor 62, causing the rotor to rotate, and this rotation is detected in a manner to be described below in order to provide an indication of the rate of flow of the fluid through the flow pipe 14.

The rotor 62 is supported on pair of suitable bearings 64, each of which is mounted in a corresponding axial recess 66 which is formed in an end of a generally cylindrical hub portion 68 of the rotor. The bearings 64 in turn are mounted on a shaft 70 which is rigidly supported in the cartridge housing 38. The shaft 70 comprises an enlarged diameter middle portion 72 which defines a pair of shoulders against which the bearings 64 are positioned to maintain the rotor 62 properly positioned on the shaft. In one embodiment of the invention, the bearings 64 are sealed lubricated ball bearings that allow the turbine flow meter to be used to measure both liquids and gases.

The shaft 70 comprises opposite end portions 74, each of which extends through an axial hole 76 in a corresponding stator 78. As shown most clearly in FIG. 6, each stator 78 comprises a number of struts 80 which extend radially from a central body portion 82 to the inner diameter of the cartridge housing 38 in order to maintain the stators 78 axially aligned within the cartridge housing. The body portion 82 is ideally configured to minimize interference with the fluid flowing through the meter cartridge 12 and to straighten the flow stream. Accordingly, as best seen in FIG. 2, the body portion 82 includes a relatively small diameter axially outer end 84 which diverges to a larger diameter axially inner end 86. The diameter of the inner end 86 is preferably about the same as the outer diameter of the hub portion 68 of the rotor 62.

The shaft 70 may be secured to the stators 78 with, e.g., two fastening nuts 88, each of which is threaded onto a corresponding end of the shaft adjacent the axially outer end 84 of the body portion 82. In addition, each strut 80 may include a stop portion 90 which extends further radially outward from its axial outer end and engages a corresponding axial end 91 of the cartridge housing 38 to maintain the struts properly positioned relative to the cartridge housing. Accordingly, when the nuts 88 are tightened, the resultant tension between the stop portions 90 and the cartridge housing 38 will firmly secure the stators 78, and thus the shaft 70 and the rotor 62, within the cartridge housing. However, if desired the stators 78 may be attached to the cartridge housing by alternative or additional means, such as welding.

Referring again to FIGS. 1 and 2, rotation of the rotor 62 by the flow of fluid is detected by a conventional magnetic pickup 92. The pickup 92 is mounted in pickup adapter 94, which in turn is secured to an intermediate adapter 96 such as by threads. The intermediate adapter 96 is threaded into a transverse port 98 in the flow pipe 14 which extends into the second bore section 28 of the through bore 18. The intermediate adapter 96 comprises an annular bottom portion 100 which engages a corresponding ledge 102 in the port 98 to thereby seal the intermediate adapter to the body 16. The intermediate adapter 96 may be alternatively or additionally sealed to the body 16 by a suitable elastomer seal 104.

The intermediate adapter 96 includes an axial aperture 106 within which a focus tip 108 is secured, such as by threads. The focus tip 108 may also be soldered to the intermediate adapter 96 in order to ensure a pressure-tight seal between the through bore 18 and outside the flow pipe 14. In addition, the intermediate adapter 96 is preferably made from a material which will magnetically isolate the focus tip 108 from the body 16, such as Nitronic 60® stainless steel.

An advantage to using the intermediate adapter 96 is that the turbine flow meter 10 may be installed in a piping system before the magnetic pickup 92 and pickup adapter 94 are connected to the intermediate adapter. This eliminates the possibility that the magnetic pickup 92 will be damaged during installation of the turbine flow meter 10.

Since the meter cartridge 12 preferably forms a loose fit with the second bore section 28, the turbine flow meter 10 ideally includes means to prevent the meter cartridge from rotating relative to the flow pipe 14. In one embodiment of the invention, the intermediate adapter 96 includes an extension leg 110 which extends axially from the bottom portion 100. As shown most clearly in FIG. 1, when the intermediate adapter is installed in the port 98, the extension leg 110 will extend a slight distance, e.g., the thickness of the cartridge housing 38, into the second bore section 28 and engage an axial slot 112 in the cartridge housing 38 (FIG. 5) in order to prevent the meter cartridge 12 from rotating within flow pipe 14.

The components of the turbine flow meter 10 may be designed so as to minimize turbulence in fluid flowing through the flow pipe 14. For example, the inner diameter of both the cartridge housing 38 and the body portion 42 of the retainer 36 may be approximately the same as the diameter of the first bore section 26 of the through bore 18. Also, the inner surface 114 of the conical surface portion 46 of the retainer 36 may tapered similar to the bore portion 116 at the second end 22 of the flow pipe 14.

Referring again to FIG. 1, the length of the body 16 of the flow pipe 14 may be designed such that the meter cartridge 12 does not occupy the entire length of the through bore 18. This will allow the body 16 to accommodate a number of supplemental ports 118 (one of which is shown in phantom) for additional sensors, such as pressure or temperature sensors, if desired.

Referring now to FIGS. 7 and 8, a turbine flow meter in accordance with another embodiment of the present invention, generally 120, is shown to comprise a meter assembly 122 which is removably mounted in a tubular flow pipe 124. The flow pipe 124 may be similar to the flow pipe 14 discussed above. In this embodiment, however, the flow pipe 124 includes a through bore 18 which comprises a first bore section 126, a second bore section 128 which is positioned on one side of the first bore section and comprises a diameter that is larger than that of the first bore section, and a third bore section 130 which is positioned on the opposite side of the first bore section and ideally comprises the same diameter as the second bore section. A first shoulder 132 is formed between the first and second bore sections 126, 128 and a second shoulder 134 is formed between the first and third bore sections 126, 130.

Referring additionally to FIGS. 9 and 10, the meter assembly 122 comprises a pair of left and right stator members 136, 138 between which the rotor 62 is rotationally supported. Each stator member 136, 138 includes a number of struts 140 which extend radially from a central body portion 142 to the inner diameter surface of the first bore section 126. As in the previous embodiment, the body portion 142 is ideally configured to minimize interference with the fluid flowing through the flow bore 18 and to straighten the flow stream.

As shown most clearly in FIG. 10, the body portion 142 of the left stator member 136 comprises an axially inner first shoulder 144 from which an axial shaft 146 extends. Also, the body portion 142 of the right stator member 138 comprises an axially inner second shoulder member 148 within which an axial recess 150 extends.

The meter assembly 122 includes a rotor 62 which is supported on pair of suitable bearings 64 in a manner similar to that described above. The bearings 64 in turn are mounted on the shaft 146, and the assembly of the rotor 62 and the bearings is retained on the shaft by a retainer ring 152.

In the present embodiment of the invention, final assembly of the meter assembly 102 is accomplished by inserting the left stator member 136, with the rotor 62 mounted thereon, into the left end of the fluid bore 18 and inserting the right stator member 138 into the right end of the fluid bore. The left stator member 136 includes a stop portion 154 which extends radially outward from the axial outer end of one or more of the struts 140 and engages the first shoulder 132. Similarly, the right stator member 138 includes a stop portion 156 which extends radially outwardly from the axial outer end of one or more of the struts 140 and engages the second shoulder 134. The left stator member 136 is retained within the fluid bore 18 by a retainer ring 158 which is positioned within a corresponding groove against the stop portion 154. Likewise, the right stator member 138 is retained within the fluid bore 18 by a retainer ring 160 which is positioned within a corresponding groove against the stop portion 156.

Although not depicted in FIGS. 7-10, the turbine flow meter 120 also includes a magnetic pickup and the associated structural and electrical components described above to enable the flow meter to detect the rotation of the rotor 62 and thereby provide an indication of the rate of flow of fluid through the flow bore 18.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A turbine flow meter which comprises:
a flow pipe which includes first and second pipe ends, an axial through bore through which a fluid to be measured may flow and a transverse port which is connected to the through bore;
a meter cartridge which comprises a tubular cartridge housing and a rotor which is rotatably supported in the cartridge housing, the cartridge housing comprising an axial slot which extends from an end of the cartridge housing to a position adjacent the rotor;
wherein the cartridge housing is slidably received in the through bore such that the slot is located opposite the port; and
a magnetic pickup assembly which is mounted in the port and which includes a portion that extends at least partially into the slot to prevent the meter cartridge from rotating relative to the flow pipe during operation of the flow meter.

2. The turbine flow meter of claim 1, further comprising a generally cylindrical retainer which is slidably received in the through bore against the meter cartridge to thereby retain the meter cartridge in the through bore.

3. The turbine flow meter of claim 2, further comprising means for retaining the retainer within the through bore.

4. The turbine flow meter of claim 3, wherein the retaining means comprises a ring seal which is removably secured within the through bore against the retainer.

5. The turbine flow meter of claim 4, wherein the ring seal comprises an annular body and a lip which extends radially outwardly from the body and is received in a corresponding groove in the through bore.

6. The turbine flow meter of claim 1, wherein the magnetic pickup assembly comprises:
a magnetic pickup which detects rotation of the rotor caused by a flow of fluid through the flow pipe;
a pickup adapter within which the pickup is mounted; and
an intermediate adapter which is mounted in the port and within which the pickup adapter is mounted;
wherein a distal part of the intermediate adapter comprises the portion of the magnetic pickup assembly which extends at least partially into the slot to prevent the meter cartridge from rotating.

7. The turbine flow meter of claim 6, further comprising a focus tip which is mounted in an aperture in the intermediate adapter.

8. The turbine flow meter of claim 7, wherein the intermediate adapter is made of a material which magnetically isolates the focus tip from the flow pipe.

9. The turbine flow meter of claim 6, wherein the flow pipe comprises a number of supplemental ports which are connected to the through bore and within each of which a corresponding sensor may be mounted.

10. A turbine flow meter which comprises:
a flow pipe which includes first and second pipe ends and an axial through bore through which a fluid to be measured may flow, the first and second pipe ends being connectable to corresponding first and second components of a piping system;
a meter cartridge which comprises a tubular cartridge housing and a rotor which is rotatably supported in the cartridge housing;
the cartridge housing being slidably received in the through bore;
a ring seal which is engageable between the flow pipe and the first component and is removably secured in the through bore between the first end and the meter cartridge to thereby retain the meter cartridge in the through bore.

11. The turbine flow meter of claim 10, wherein the ring seal includes an annular body and a lip which extends radially outwardly from the body and is received in a corresponding groove in the through bore.

12. The turbine flow meter of claim 10, further comprising:
a magnetic pickup which detects rotation of the rotor;
a pickup adapter within which the pickup is mounted; and
an intermediate adapter within which the pickup adapter is mounted, the intermediate adapter being mounted in a radial port in the flow pipe which is connected to a portion of the through bore adjacent the rotor.

13. The turbine flow meter of claim 12, further comprising a focus tip which is mounted in an aperture in the intermediate adapter.

14. The turbine flow meter of claim 13, wherein the intermediate adapter is made of a material which magnetically isolates the focus tip from the flow pipe.

15. The turbine flow meter of claim 12, wherein the flow pipe comprises a number of supplemental ports which are connected to the through bore and within which corresponding sensors may be mounted.

16. The turbine flow meter of claim 12, wherein:
the cartridge housing comprises an axial slot which extends to a position adjacent the rotor;
the meter cartridge is positioned such that the slot is located opposite the port; and
the intermediate adapter includes a portion which extends at least partially into the slot to prevent the meter cartridge from rotating relative to the flow pipe during operation of the flow meter.

17. The turbine flow meter of claim 10, further comprising a cylindrical retainer which is slidably received in the through bore between the ring seal and the meter cartridge.

18. The turbine flow meter of claim 10, wherein:
the through bore includes a first bore section which comprises a first diameter and a second bore section which is located between the first bore section and the first pipe end, the second bore section comprising a second diameter which is larger than the first diameter; and
wherein the cartridge housing is slidably received in the second bore section against a first shoulder which is defined between the first and second bore sections.

19. The turbine flow meter of claim 18, wherein:
the through bore includes a third bore section which is located between the second bore section and the first pipe end, the third bore section comprising a third diameter which is larger than the second diameter; and
the turbine flow meter further comprises a cylindrical retainer which is slidably received in the third bore section between the ring seal and a second shoulder which is defined between the second and third bore sections.

20. A turbine flow meter which comprises:
a flow pipe which includes first and second pipe ends and an axial through bore through which a fluid to be measured may flow;
a meter cartridge which is positioned in the flow pipe; and a magnetic pickup assembly which is mounted to a portion of the flow pipe radially adjacent the meter cartridge;

the meter cartridge comprising a tubular cartridge housing which is slidably received in the through bore and includes first and second housing ends, a first stator which is slidably received in the first housing end, a second stator which is slidably received in the second housing end, a shaft which is supported coaxially within the cartridge housing by the first and second stators, and a rotor which is rotatably supported on the shaft between the first and second stators;

the first stator comprising an axial first body portion, a plurality of first struts which extend radially between the first body portion and the cartridge housing, and a first stop portion which extends radially outwardly from a first strut and releasably engages the first housing end to thereby prevent the first stator from moving axially toward the second housing end;

the second stator comprising an axial second body portion, a plurality of second struts which extend radially between the second body portion and the cartridge housing, and a second stop portion which extends radially outwardly from a second strut and releasably engages the second housing end to thereby prevent the second stator from moving axially toward the first housing end;

wherein the meter cartridge further comprises means for preventing the first and second stators from moving axially away from each other once they have been positioned in the cartridge housing.

21. The turbine flow meter of claim 20, wherein the preventing means comprises the shaft.

22. The turbine flow meter of claim 21, wherein the shaft is connected to the first and second stators.

23. The turbine flow meter of claim 22, wherein each of the first and second stators comprises an axial hole through which the shaft extends.

24. The turbine flow meter of claim 23, wherein the preventing means further comprises a pair of nuts, each of which is connected to a corresponding end of the shaft such that the first and second stators are positioned between the nuts.

* * * * *